United States Patent
Shishalov et al.

(10) Patent No.: US 10,178,353 B2
(45) Date of Patent: Jan. 8, 2019

(54) SYSTEM AND METHOD FOR VIDEO SURVEILLANCE OF A FOREST

(71) Applicants: Ivan Sergeevich Shishalov, Nizhny Novgorod (RU); Oleg Andreevich Gromazin, Nizhny Novgorod (RU); Yaroslav Sergeevich Solovyev, Nizhny Novgorod (RU); Aleksandr Vladimirovich Romanenko, Nizhny Novgorod (RU); Ivan Vasiilevich Esin, Nizhny Novgorod (RU)

(72) Inventors: Ivan Sergeevich Shishalov, Nizhny Novgorod (RU); Oleg Andreevich Gromazin, Nizhny Novgorod (RU); Yaroslav Sergeevich Solovyev, Nizhny Novgorod (RU); Aleksandr Vladimirovich Romanenko, Nizhny Novgorod (RU); Ivan Vasiilevich Esin, Nizhny Novgorod (RU)

(73) Assignee: LIMITED LIABILITY COMPANY "DISICON", Nizhny Novgorod (RU)

( * ) Notice: Subject to any disclaimer, the term of this patent is extended or adjusted under 35 U.S.C. 154(b) by 90 days.

(21) Appl. No.: 15/587,445

(22) Filed: May 5, 2017

(65) Prior Publication Data
US 2017/0244935 A1     Aug. 24, 2017

Related U.S. Application Data (62) Division of application No. 14/002,220, filed as application No. PCT/RU2012/000045 on Jan. 31, 2012, now Pat. No. 9,686,513.

(30) Foreign Application Priority Data

Mar. 2, 2011   (RU) .................................. 2011108066

(51) Int. Cl.
*H04N 7/18* (2006.01)
*G08B 17/00* (2006.01)
(Continued)

(52) U.S. Cl.
CPC ......... *H04N 7/181* (2013.01); *G06K 9/00771* (2013.01); *G06K 9/6202* (2013.01);
(Continued)

(58) Field of Classification Search
CPC ...... H04N 7/181; H04N 7/18; H04N 5/23296; G06K 9/00771; G06K 9/6202; G08B 17/005; G08B 17/125
See application file for complete search history.

(56) References Cited

U.S. PATENT DOCUMENTS 6,198,485 B1 *   3/2001   Mack ..................... G06F 3/013
                                                                345/419
9,317,110 B2 *   4/2016   Lutnick .................. G06F 3/011
(Continued)

FOREIGN PATENT DOCUMENTS

BY       8173 C1     6/2006
KR   100839090 B1    6/2008
(Continued)

OTHER PUBLICATIONS

English Abstract of BY8173 retrieved from Google Translate on Sep. 10, 2016.
(Continued)

*Primary Examiner* — Nhon T Diep (57) ABSTRACT

The invention relates to the forest video monitoring. A method and system are provided for automatically binding a video camera to the absolute coordinate system and determining changes in the video camera binding. In one aspect, the method comprises the steps of: in each of at least two predetermined time moments, aiming the video camera at an
(Continued)

object a position of which in the absolute coordinate system centered in a point in which the video camera resides is known at said moment, and determining an orientation of the video camera in a native coordinate system of the video camera; and, based on the determined orientations of the video camera and positions of the object, calculating a rotation of the native coordinate system of the video camera in the absolute coordinate system. The calculated rotation of the video camera's native coordinate system is used to recalculate coordinates of an observed object from the video camera's native coordinate system into the absolute coordinate system. The technical result relates to the improved accuracy of locating the observed object.

4 Claims, 3 Drawing Sheets (51) Int. Cl.
G08B 17/12 (2006.01)
G06K 9/00 (2006.01)
G06K 9/62 (2006.01)
H04N 5/232 (2006.01)
G01C 17/34 (2006.01)

(52) U.S. Cl.
CPC ......... *G08B 17/005* (2013.01); *G08B 17/125* (2013.01); *H04N 5/23296* (2013.01); *H04N 7/18* (2013.01); *G01C 17/34* (2013.01)

(56) References Cited

U.S. PATENT DOCUMENTS

2010/0259619 A1* 10/2010 Nicholson ............ H04N 5/2251 348/158
2011/0128372 A1* 6/2011 Malecki ............... G05D 1/0676 348/135
2012/0035799 A1* 2/2012 Ehrmann ............. A63F 7/0664 701/28
2012/0214590 A1* 8/2012 Newhouse ............. G06F 3/011 463/31

FOREIGN PATENT DOCUMENTS

RU 2293998 C2 2/2007
WO 0023959 A1 4/2000

OTHER PUBLICATIONS (Book) David A. Forsayt, "Compute Vision. Morden Approach/ Kompyutemoe zrenie. Sovremennyy podkhod" ISBN 9785845905420/ 5845905427.

International Search Report with regard to PCT/RU2012/00045 (dated Jun. 28, 2012).

* cited by examiner

SYSTEM AND METHOD FOR VIDEO SURVEILLANCE OF A FOREST

This application is a divisional of U.S. patent application Ser. No. 14/002,220, filed Nov. 4, 2013.

CROSS REFERENCE

This is a division of patent application Ser. No. 14/002,220, filling date Nov. 4, 2013, FOREST FIRE VIDEO MONITORING SYSTEM AND METHOD, which claims priority to PCT Application Ser. No. PCT/RU12/00045, filling date Jan. 31, 2012, FOREST FIRE VIDEO MONITORING SYSTEM AND METHOD, assigned to the same assignee as the present invention, which are herein incorporated by reference in their entirety.

BACKGROUND

The present invention relates generally to the field of video surveillance, and more particularly, to a system and method for video monitoring of the forest, which, in general, provides the ability to monitor large forest areas for early detection of forest fires for further localization and extinguishing.

PRIOR ART

The forest fire video monitoring systems intended for the detection and location of forest fires are relatively new. However, their importance is ever growing, as the problem of forest fires can rightly be considered as one of the most serious and unresolved human problems at the moment. Forest fires occur and bring great damage in many countries of the world, as evidenced by wildfires in Russia in the summer of 2010, which had disastrous consequences, including also failure to comply with their early detection and their location, as has been many times discussed in detail in the media.

Figure 1:
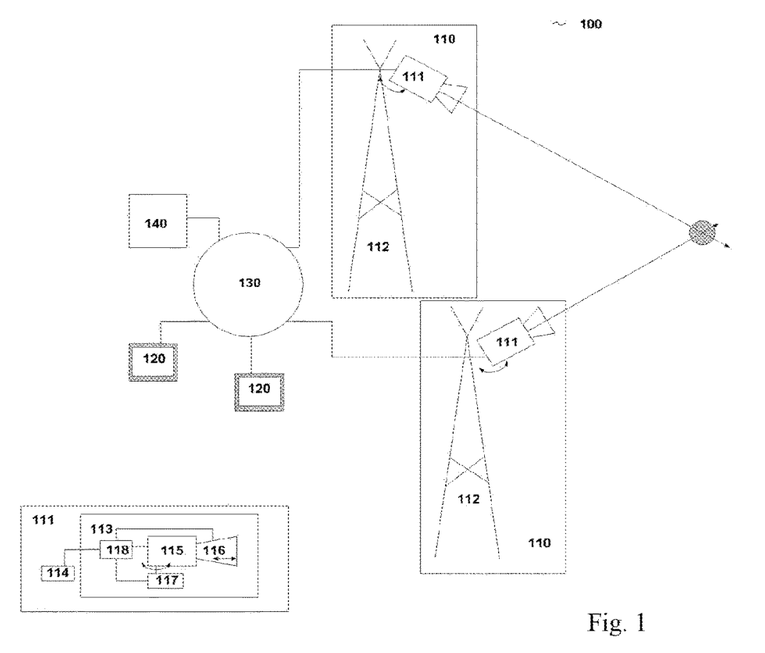
FIG. 1 is a schematic partial view of the forest fire video monitoring system.

In a typical case, illustrated in FIG. 1, the forest fire video monitoring system 100 includes one or more remotely controlled video monitoring points 110 and one or more automated operator workstations 120 associated with them for the proper operation of the video monitoring points 110.

The equipment 120 of an automated operator workstation, in general, is based on well-known computer and communication technologies, and it typically contains a computer with special software and software for general use configured to remotely exchange data. The hardware and the software for general use (e.g., operating system) forming part of such a computer are well known in the art. Thus, the term "computer" can comprise a personal computer, a laptop, a set of interconnected computers, etc. with characteristics that meet the requirements of the system 100. The computer has a display device attached thereto that displays, when the computer is in operation, a graphical user interface (GUI) associated with a specialized application, by means of which the operator monitors visually the territory and controls the video monitoring points 110. The interaction with the elements of the graphical user interface is performed by means of well-known input devices connected to the computer, such as keyboard, mouse, etc.

Such an operator workstation can be organized in a specialized center of control and monitoring. The presence of multiple workstations 120 allows distributing the load among multiple operators to thereby enhance the quality of detection.

Each video monitoring point 110 is substantially the transmitting side equipment 111 arranged on a high-rise building 112.

The high-rise building 112, in general, can be any high-rise building, which meets the requirements imposed on the system 100 (i.e., adapted to accommodate the transmitting side equipment at a sufficient height and configured to inspect large areas), and is usually a communication service provider tower, mobile operator tower, television tower, lighting tower etc.

Generally, the term "transmitting side equipment" 111 denotes the equipment arranged on a high-rise building 112 containing a controlled video device 113 and a communication module 114 for communication/data exchange with an operator workstation (workstations) 120.

The controlled video device 113 is generally a digital video camera 115 (i.e., a device that converts an optical range of electromagnetic waves, or a range close to the optical range, into the electrical signal), equipped with a zoom 116 (i.e., with an arrangement, which is designed for zooming in/out the obtained image) and mounted on the rotating device 117, through which one can mechanically change the orientation of the video camera 115 with high accuracy.

The transmitting side equipment 111 also contains a camera control unit 118, connected to the communication module 114, video camera 115, zoom 116 and rotating device 117 and the rotating device, and intended for the general control over the functions of the controlled video device 113 as a whole and its components in particular. In this manner, when receiving control signals from the operator via the communication module 114, the control device 118 is adapted to set the required spatial orientation of the camera 115 (for example, to point it at the object you want to monitor), by operating the rotating device 117, and/or to perform zooming in/out of the picture of the object under surveillance, by operating the zoom. In addition, the control unit 118 is adapted to determine the current spatial orientation of the video camera 115 and provide data on its current spatial orientation through the communication module 114 to the requesting party (in particular, to the operator workstation 120, where the data, for example, are displayed in the graphical user interface). The functional capabilities listed here are well-known properties of the modern controlled video camera assemblies available on the market.

Generally, the control device 118 is a microprocessor-based hardware unit of the controller or microcomputer—type, etc., obvious to those skilled in the art, programmed in a known manner and/or programmable to perform the functions assigned to it. The programming of the control unit 118 can be performed, for example, by writing ("flashing") its microcode software ("firmware"), which is well known in the art. Accordingly, the video camera control device 118 is typically connected to a storage device (e.g., an integrated flash memory) which stores the related (microcode) software, the execution of which implements the functions associated with the control device 118.

The operator workstations 120 may be connected to the monitoring points, both directly and via a communication network (e.g., network 130) using well-known and used wired and/or wireless, digital and/or analog communications technologies, and thus the communication module 114 of the video monitoring point and the computer communication interface of the operator workstation 120 should meet the communication standards/protocols for inducing such a link.

Thus, an exemplary network 130, to which there are connected the video monitoring points and the workstations 120, can be an address network, such as the Internet. If the video monitoring point 110 is near a communication channel belonging to an external provider, which is a common case, it is preferable to use this channel to connect the transmitting side equipment 111 to the Internet. If the video monitoring point 110 can not be connected directly to the Internet, the well-known wireless broadband technologies (e.g. WiFi, WiMAX, 3G, etc.) are used for communication between the transmitting side equipment 111 and the Internet access point. In a similar way, the operator workstations 120 are connected to the network 130. For example, depending on the implemented access technology, modem (including wireless), network interface card (NIC), wireless access card, etc., which are external or internal in relation to the computer of the operator workstation 120, can be used for connecting to the network 130.

The system 100 also preferably includes a networked 130 server 140, to which are delegated the centralized management functions of the totality of video monitoring points 110 and their interaction with the operator workstations 120 to ensure reliable operation of the system 100. The server 140 is usually a high-performance computer or a set of interconnected computers (for example, blade server bay) with specialized server software installed on it (them), having high speed (e.g. optical) connection to the Internet. The hardware/software implementation of such a server is obvious to those skilled in the art. In addition to the general system 100 management functions, the server 140 can perform a variety of highly specialized functions—for example, it can operate as a video server, providing intelligent intermediate data processing and sending them to the user upon request.

The description of specific implementations of data/signal exchange between the video monitoring points 110, the operator workstations 120 and the server 140 via the network 130 is omitted because they are widely known in the art.

With such a method for implementing the forest fire video monitoring system, a single user is able to monitor a large enough controlled territory, while manipulating multiple cameras. In addition, due to the above characteristic functional capabilities, the ability is provided to automatically quickly determine the location of the source of fire visible from multiple cameras, using a well-known method of azimuth, and the storage in the memory (e.g., in the server 140 or in the computer of the operator workstation 120) of the specified patrol path for quick access thereto and performing the monitoring. Here, the "patrol path" is the specified sequence of changing the orientation of the camera, designed for getting the visual information regarding the required specified area.

It should be noted that the performance of modern electronic hardware allows creating on their basis imaging and control devices among the components of the forest fire video monitoring system with a wide user functionality, which greatly simplifies the operator's work. In addition, modern hardware, with a special runtime software, can take over some of the functions for the automatic detection of potentially dangerous objects on video or still images, obtained from the video cameras (when monitoring forests, such objects may be smoke, fire, etc.). Such systems of computer vision intended to find the image of dangerous objects can use a priori information about the features of smoke or fire, for example, specific movement, color, brightness, or other manifestations of fire, for example, they can detect the warm air from a fire, with a thermal imager, or with the gas analyzer they are able to detect emissions of certain gases. Similar systems of computer vision are used in many industries, ranging from robotics to security systems, which is described in detail, for example, in "Computer Vision: Modern Approach", David Forsyth and Jean Ponce, Williams Publishing, 2004, p. 928. In this context, an intrinsic characteristic of automatic detection based on computer vision is the probability of false alarm and target missing that must be reduced by all means in each video monitoring system.

This intelligent subsystem using the specified computer vision technology, can also be implemented at the operator workstation 120, the server 140, and even in the controlled video device 113 itself.

Above is a generalized structural description of a typical modern forest fire video monitoring system, the principle of which is based on the use of controlled cameras. The given generalized description is not meant to be exhaustive and is intended to be a more user-friendly presentation of the invention, described in detail below.

The known examples of such forest fire video monitoring systems are the systems of ForestWatch (Canada), IPNAS (Croatia) and FireWatch (Germany). Similar systems have been developed in the Russian Federation (for example, "Klen" (Maple), "Baltika" (the Baltic), "Lesnoi Dosor" (Forest Watch).

It should be noted that the development and deployment of such forest fire video monitoring systems became possible only in the last few years. Only now, the number of cell phone towers is such that they cover the main fire risk areas, thereby minimizing infrastructure costs. In addition, broadband Internet services have also become much more affordable which allows exchanging large amounts of information over the Internet and transmitting real-time video, and the cost of equipment for wireless communication over long distances reduced. It should be further noted that the detection of forest fires with cameras started in the early XXI$^{st}$ century, but the systems proposed at the time, were primitive cameras with swivel function and the operator's screen, which was supposed to be in close proximity to the point of video monitoring. In practice, the proposed systems could not be scaled up and used for detecting fires even within a forest district, not to mention the region.

The existing forest fire video monitoring systems are perceived as having the following shortcomings.
1. The Problem of Accuracy when Determining the Coordinates of the Visible Object The accuracy of determining the coordinates of the visible object is determined by the parameters such as:
   accuracy of determining the location of the video camera (accuracy of binding the video camera to the terrain);
   accuracy of binding the video camera orientation to the coordinate system relative to the north and the angle of deviation from the mathematical horizon (vertical angle).

As noted above, with the rotating device one can change the orientation of the camera—such rotating devices make it possible to change to a certain extent the vertical and horizontal angles, i.e. actually the direction of the video camera in a spherical coordinate system changes, which spherical coordinate system being tied directly to the rotating device (to the video camera's inherent coordinate system.)

When installing and operating the video camera, it is necessary to determine the orientation of the camera's inherent coordinate system relative to the spherical coordinate system, the center of which is situated at the location of the video camera, the unit vector with the coordinates $\varphi=0$, θ=0, ρ=1 coincides with the north direction, and the unit vector with the coordinates φ=0, θ=−90°, ρ=1 coincides with the vertical (in astronomy such coordinate system is called topocentric or horizontal, here this system of coordinates will be called "absolute coordinate system of the video camera").

The current location of the video camera can be determined quite accurately, for example, with the use of the modern global positioning system (GPS).

The accuracy of determining the current orientation of the camera in its inherent coordinate system can also be quite high, which is provided by modern rotating devices (up to 0.1-0.05', as, for example, in the case of controlled video cameras manufactured by AXIS), and this accuracy is ever growing with the development of technology.

At the same time, it is almost impossible to eliminate accuracy problems when binding the video camera's inherent coordinate system to the absolute coordinate system—namely this binding is responsible for the accuracy of determining the final location of the visible object. This problem is caused by the complexity of the original binding (when mounting the video camera) and the sub-binding during the system operation necessitated by the deformation of the high-rise building structure, on which the camera is fixed, by the nonideal fixing of the camera and other factors.

2. High Probability of False Alarms

With the use of the computer vision subsystem, briefly described above, an important factor is the possibility to validate (i.e., confirm) the potentially dangerous objects. This confirmation can be accomplished, for example, by the operator that sieves out the false detected objects. This validation facilitates the operation of the automatic subsystem, as in the case of subsequent detection of a dangerous object in the same direction, the subsystem can use the information entered by the operator on the type of the object. The operation of such an algorithm must be based on the possibility of determining the exact current orientation of the video camera, so that later, when an object is detected in the same direction (i.e., essentially the same object), exclude it from the class of dangerous objects.

To perform this function, it is necessary to determine with accuracy that the current direction of the camera coincides with the one that has been validated by the user, with sufficient accuracy for the operation of the subsystem. This procedure is rather difficult because, as mentioned above, a video camera, being fully adapted for rigid fixation on the rigid structure of the high-rise building, can not provide a complete stillness, that is, the orientation of the camera's inherent coordinate system displaces, and therefore, the accuracy of the sieving procedure is related to the accuracy of determining the current direction.

It becomes the most important in detecting objects at a great distance (more than 15 km) when the angular size of the object is small enough (less than 1'): in this case, even a small deviation of the camera will cause incorrect assessment of the location of the said object.

3. Failure to Determine the Location of the Object Visible from Only One Camera

This problem occurs on the boundary areas where it is not possible or economically feasible to place the second camera for determining the location of the dangerous object. In addition, failure to determine at least approximately the location of the object with a single video camera makes it difficult to find the object with another video camera, from which it may also be seen.

SUMMARY OF THE INVENTION

One object of the present invention is to provide a forest fire video monitoring system and a method implemented by it that involves automatic binding of the video camera's inherent coordinate system to the absolute coordinate system associated with the video camera, in order to improve the accuracy of determining the location of the observed object. The system and the method according to the present object are aimed at remedying the first of these shortcomings.

According to the aspect corresponding to this object, there is proposed a forest fire video monitoring system. The proposed system includes at least one remotely controlled video monitoring point and at least one computer-assisted operator workstation for the operation of this video monitoring point. The system may further include a server, the video monitoring points, the server and the operator workstations being mutually connected and configured to communicate (e.g., by means of an address network).

The remotely controlled video monitoring point includes a high-rise building and the transmitting side equipment located on the high-rise building. The transmitting side equipment includes a camera on a rotating device and a camera control unit configured to determine the current spatial orientation of the video camera in the inherent coordinate system of the video camera. The video camera is equipped with a zoom lens.

The proposed forest fire video monitoring system also contains a computer-integrated module configured in each of at least two specified time moments to get a camera orientation, defined by the camera control unit, pointed at a known astronomical object, in the inherent coordinate system of the video camera and to determine, based on a specified location of the video monitoring point and the given time moment, the position of the astronomical object in the absolute coordinate system centered at the location of the video camera. The computer-integrated module is also configured to calculate, on the basis of certain orientations of the video camera and positions of the astronomical object, the rotation of the video camera's inherent coordinate system in the absolute coordinate system.

The computer-integrated module may be placed at the server and/or the workstation of the operator and/or in the transmitting side equipment of the video monitoring point.

The astronomical object is preferably the Sun, the location of the video monitoring point being determined by its geographical coordinates and the position of the astronomical object is determined by its angular height above the horizon and the azimuth.

Pointing the camera to the astronomical object can be achieved by manual alignment of the image center, obtained from the video camera, with the center of the astronomical object.

The proposed system may further comprise a computer-integrated intelligent subsystem configured, on the basis of the computer vision technology, to point the video camera at an astronomical object by means of the automatic detection of an astronomical object based on the analysis of images obtained from the video camera, and the automatic alignment of the image center, obtained from the video camera, with the center of the astronomical object.

When you point the video camera at an astronomical object, with the use of the zoom, the astronomical object is preferably zoomed in on as much as possible.

According to the method for automatically binding the video camera's inherent coordinate system to the absolute coordinate system, being realizing by the claimed forest fire video monitoring system, at each of the at least two specified time moments, they point the video camera at the known astronomical object and determine the orientation of the camera in the inherent coordinate system of the video camera and determine, on the basis of the specified location of the said video monitoring point and the given time moment, the position of the astronomical object in the absolute coordinate system centered at the location of the video camera. Then they calculate, on the basis of certain camera orientations and positions of the astronomical object, the rotation of the video camera's inherent coordinate system in the absolute coordinate system.

On the basis of the calculated rotation of the video camera's inherent coordinate system, it is possible to perform a recalculation of coordinates of the observed object from the video camera's inherent coordinate system into the absolute coordinate system.

It should be emphasized that, according to the aspect under consideration, the said astronomical object may be, as a matter of fact, any perceptible object, whose position in the absolute coordinate system camera is known at a given time moment.

Another object of the invention is to provide a forest fire video monitoring system and a method implemented by it, which determine a change in binding of the video camera in order to accurately determine its current direction while sieving out non-hazardous objects. In fact, the system and the method according to the present object are aimed at remedying the second of these shortcomings.

According to the aspect corresponding to this object, there is proposed a forest fire video monitoring system comprising the same components as listed above in the prior aspect. The proposed system also contains a data store to store the camera orientation in the video camera's inherent coordinate system, defined by the camera control unit after pointing the camera to each of at least two specified distinct fixed objects on the terrain. The computer-integrated module in the system is therewith configured, as regards each object of the said objects, to receive the current orientation of the video camera's inherent coordinate system, defined by the camera control unit after re-pointing the video camera at the object. The computer-integrated module is also configured, on the basis of the current orientations of the video camera and the corresponding stored orientations of the video camera, to calculate the rotation of the video camera's inherent coordinate system.

Preferably, the computer-integrated module is further configured, when comparing the current orientation of the camera pointed at the observed object, with the stored video camera orientation when pointed at a previously analyzed object, to adjust this stored orientation of the camera on the basis of the calculated rotation of the video camera's inherent coordinate system.

According to the method implemented by the proposed forest fire video monitoring system, which method comprises determining a change in binding of the video camera, they point the camera at each of at least two distinct specified fixed objects on the terrain and determine the orientation of the video camera's inherent coordinate system. Then certain orientations of the video camera are stored. After that, as regards each object of the said objects, the camera is pointed according to the stored orientation of the video camera corresponding to the object, and, in case of deviation from the camera object, the camera is re-pointed at the object and the current orientation of the camera's video camera's inherent coordinate system is determined. Finally, on the basis of the certain current orientations of the video camera and the corresponding stored orientations of the video camera, they calculate a rotation of the video camera's inherent coordinate system. When comparing the current orientation of the camera pointed at the observed object, with the stored video camera orientation pointed at the previously analyzed object, this stored video camera orientation can be adjusted on the basis of the calculated rotation of the video camera's inherent coordinate system.

Yet another object of the present invention is to provide a forest fire video monitoring system and a method implemented by it, which are used to determine the distance to the observed object with one video camera with sufficiently high accuracy. The system and the method according to the present object are substantially aimed at remedying the third of the above shortcomings.

BRIEF DESCRIPTION OF THE FIGURE DRAWINGS

The above and other aspects and advantages of the present invention are disclosed in the following detailed description, made with reference to the figure drawings, in which.

DETAILED DESCRIPTION OF THE INVENTION

In the following disclosure of the present invention, reference will be made to the forest fire video monitoring system 100 of FIG. 1, which description of the given system is fully applicable to the disclosure of the invention. In this section, in order to avoid unnecessary repetitions and cluttered presentation, the components of the video monitoring system 100, which are generally characteristic of the prior art systems, will not be described again in detail.

Further, the disclosure of the invention is provided in sections corresponding to the objectives stated above.

1. Automatic Binding of the Video Camera's Inherent Coordinate System to the Absolute Coordinate System Referring to FIG. 2, there is described the method 200 implemented by the video monitoring system (such as the system 100 of FIG. 1) for automatically binding the video camera's inherent coordinate system (CS) to the absolute coordinate system.

In astronomy, there are known the methods to determine with high accuracy horizontal (topocentric) coordinates (i.e., the azimuth (angle from the north direction) and the angular height ((angle from the mathematical horizon)) of various celestial bodies, such as the Sun, on the basis of geographical coordinates of the observer and the exact time of day. The widespread use of these methods is known, in particular, in marine navigation.

Figure 2:
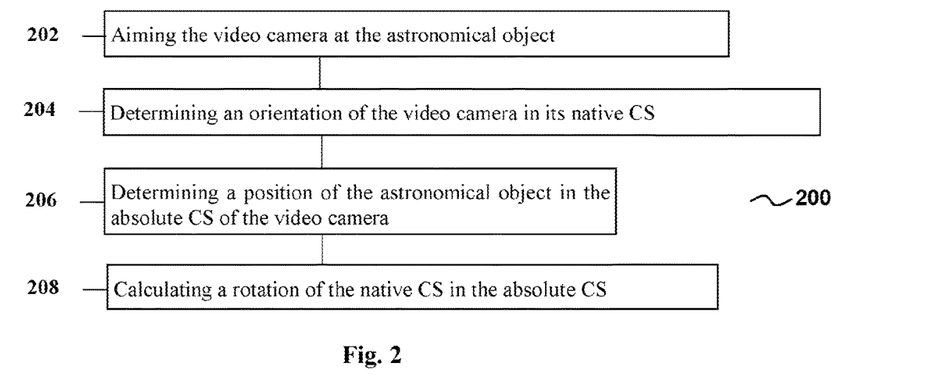
FIG. 2 is an illustrative logical flowchart of the method for automatically binding the video camera's inherent coordinate system to the absolute coordinate system of the present invention.

In step 202, the video camera 115 is pointed at a known astronomical object (such as the Sun, the Moon, etc.).

The camera 115 can be pointed manually, that is, the operator detects an astronomical object when viewing the area, and points a video camera thereto, such that the center of the image received from the camera coincides with the center of the object in question. In an exemplary embodiment, this is accomplished by the interaction of the operator with the use of input devices, with the corresponding elements of the graphical user interface appearing in the display device, so that the computer of the operator workstation 120 generates control commands sent over the network 130 (possibly through the server 140 and with its direct participation) to the appropriate receiving side equipment 111, where these commands through the communication module 114 arrive in a camera control unit 118, which, basing on them, generates the control signals for driving the rotating device 117 to set a spatial orientation of the camera 115 such that this one was pointed at the corresponding astronomical object.

This procedure can also be performed automatically, that is in the automatic mode, the video camera 115 views the area and, by means of special computer vision algorithms implemented in the system 100, as noted above, detects an object with specified characteristics (for example, in the case of the Sun it will be a bright circle).

In so doing, when the video camera 115 is pointed at an astronomical object, this astronomical object is preferably zoomed in on as much as possible (for this, in the exemplary embodiment, the camera control device 118 appropriately controls the zoom 116) and the center of the image obtained from the camera is manually or automatically aligned with the center of the astronomical object.

The location of the astronomical object can be therewith estimated with an accuracy up to several tenths/hundredths of a degree. Thus, the angular size of the Sun is about 31'27". Modern cameras can achieve a magnification in which the viewing angle is 1'. Computer vision techniques allow determining the center position of the circle in the image with an accuracy up to a few pixels. That is, if the video camera has a resolution of one or more megapixels, the accuracy of determining the Sun direction may be about 0.05".

After pointing the camera at an astronomical object, in step 204 the orientation of the camera in its inherent coordinate system is determined, that is, the orientation of the camera in its inherent coordinate system associated with the mechanics of the video camera. As mentioned above, this functional capability is provided in modern controlled video cameras and implemented, for example, by the camera control device 118.

In step 206, on the basis of the known exact location of the video monitoring point 110, they determine the position of the astronomical object in the video camera's absolute coordinate system at the current time. As mentioned above, in astronomy, there are known methods and formulas based on which and knowing the geographic coordinates of the observer and the exact time of day, it is possible to determine the azimuth and the altitude of the astronomical object, that is, the coordinates of the object in the horizontal coordinate system.

The procedure in stages 202-206 should be performed several times, waiting some period of time between successive accomplishments. The minimum number of accomplishments is two, which follows from the following detailed discussion. At the same time, in order to improve accuracy, it is possible to accomplish further this procedure, since however precise the devices might be, each measurement will allow a certain error, which can be reduced by multiplying the said measurements/determinations.

It is the most convenient to carry out this procedure on the astronomical object the Sun. In this case, the video camera can be pointed at the Sun twice—just after sunrise and before sunset, when the brightness is sufficient for detection, but not too high in order to avoid the formation of the various glares on the lens and not to damage the electronics of the video camera. It should be emphasized once again that in each of these two points in time the video camera is pointed at the Sun (step 202), its orientation is determined in its inherent coordinate system (step 204), and there is determined the position of the astronomical object in the absolute coordinate system, knowing the exact time corresponding to this point in time and the precise geographical coordinates of the video camera (step 206).

In step 208, on the basis on the video camera orientations and positions of the astronomical object determined in step 204 and 206, they calculate the rotation of the video camera's inherent coordinate system in the absolute coordinate system associated with it. The calculated rotation of the video camera's inherent coordinate system allows determining the recalculation rates for the coordinates of the observed object from the video camera's inherent coordinate system in the absolute coordinate system.

In fact, the following correspondence is achieved: the vertical and horizontal (panoramic) angle in the video camera's inherent coordinate system correspond to the height of an astronomical object (for example, the Sun) from the mathematical horizon (vertical angle in the absolute coordinate system), linked to the location of the camera (observer), and the azimuth (horizontal angle in the absolute coordinate system), bound to the location of the video camera.

For further recalculation of the video camera coordinate system to the absolute (horizontal) coordinate system, it is necessary, on the basis on the correspondence data, to determine the rotation of the inherent coordinate system in the absolute coordinate system, and to this end, it is possible for example, to determine the Euler angles. The Euler angles are the angles describing the rotation of a perfectly rigid body in a three-dimensional Euclidean space.

Having defined the Euler angles, it is possible for each point in the inherent coordinate system, to get the value in the absolute coordinate system, which means that for every visible object we can recalculate the obtained object direction in the absolute coordinate system associated with the location of the camera, i.e., in fact, eliminate the effect of the above factors on the accuracy of determining the direction of the observed object.

Mathematically, this is expressed as follows.

We obtain two correspondences between two observation points in the horizontal coordinate system (azimuth (a), height (v)) and two points in the video camera's inherent coordinate system (panoramic angle (p), vertical angle (t)):

(a1, v1)–(p1, t1),
(a2, v2)–(p2, t2).

According to the example above, these points can correspond to the two pointings of the video camera to the Sun.

Based on this, it is necessary to obtain three Euler angles e1, e2, e3, that is e1=f1(a1, v1, p1, t1, a2, v2, p2, t2),
e2=f2(a1, v1, p1, t1, a2, v2, p2, t2),
e3=f3(a1, v1, p1, t1, a2, v2, p2, t2).

Then, knowing the three Euler angles, we obtain for each (p, t) the correspondence (a, v), that is a=f1(p, t, e1, e2, e3),
v=f2(p, t, e1, e2, e3).

Let us dwell on the problem of coordinate recalculation and determination of Euler angles.

Direct Problem

Figure 3:
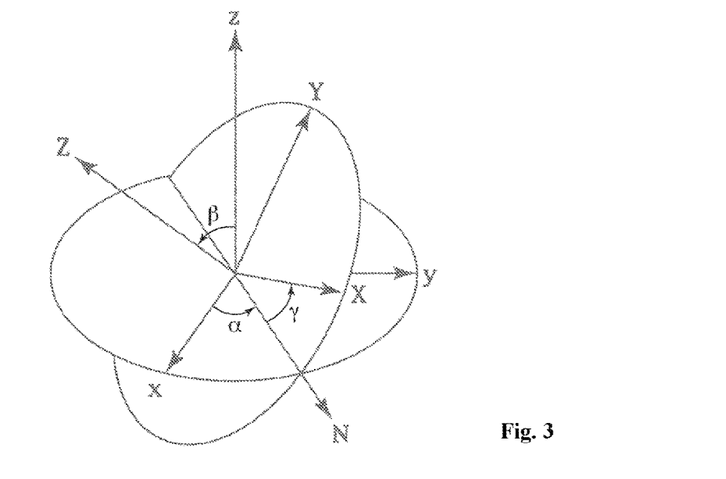
FIG. 3 is an Illustration of the Euler angles.

The correspondence between the coordinates of the visible object in the video camera's inherent coordinate system (p, t), where p—panoramic angle, t—vertical angle, and the absolute coordinates (a, v), where a—azimuth, v—angular height above the mathematical horizon, is defined by the Euler angles $\alpha$, $\beta$, $\gamma$, which in this case describe the rotation (orientation) of the video camera's inherent coordinate system in the absolute coordinate system. FIG. 3 schematically shows the Euler angles. The "camera binding" or "binding of the inherent coordinate system camera" in this application substantially refers to a certain orientation (rotation) of the video camera's inherent coordinate system in the absolute coordinate system, described by the Euler angles.

The Euler angles allow bringing any position of the system to the current position. Let us denote the initial coordinate system as (x, y, z), and the final one as (X, Y, Z). The intersection of the coordinate planes xy and XY is called the nodal line N, where:

angle $\alpha$—angle between the axis x and the nodal line.
angle $\beta$—angle between the axes z and Z.
angle $\gamma$—angle between the axis X and the nodal line.

The rotations of the coordinate system by these angles are called precession, nutation and intrinsic rotation (spin). These rotations are non-commutative, and the final position of the system depends on the order in which the rotations are performed. In the case of Euler angles, it is a sequence of 3, 1, 3 (Z, X, Z) (See FIG. 3).

Having determined the Euler angles, the rotation matrix is calculated, based on which the angles (a, v) are uniquely determined for each pair (p, t). The rotation matrix of Cartesian coordinates for the Euler angles is as follows:

$$M(\alpha, \beta, \gamma) = \begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

To use this matrix, the angles (p, t) must be converted to a Cartesian coordinate system. The angle p corresponds to the angle $\varphi$ in spherical coordinates, and the angle $\theta = \pi/2 + t$. The radius of the sphere is not important, because its size does not change when rotating, so r=1. The coordinates in the Cartesian coordinate system are defined as:

$$\begin{cases} x = r\sin\theta\cos\varphi, \\ y = r\sin\theta\sin\varphi, \\ z = r\cos\theta. \end{cases}$$

In multiplying the rotation matrix to a column vector $$\begin{pmatrix} x \\ y \\ z \end{pmatrix},$$

the column vector $$\begin{pmatrix} x_1 \\ y_1 \\ z_1 \end{pmatrix}$$

is determined. Based on a specific column vector, new spherical coordinates are identified:

$$\begin{cases} \theta_1 = \text{arctg}\left(\frac{\sqrt{x_1^2 + y_1^2}}{z_1}\right). \\ \varphi_1 = \text{arctg}\left(\frac{y_1}{x_1}\right) \end{cases}$$

Thus, the azimuth of point corresponds to $\varphi_1$, and the angle of inclination corresponds to $$\theta_1 - \frac{\pi}{2}.$$

That is, when knowing p and t and Euler angles $\alpha$, $\beta$, $\gamma$, a, v are identified.

Inverse Problem

In order to determine the Euler angles basing on the known relations of orientations in the inherent and absolute coordinate systems, it is necessary to solve the problem which is inverse to the above direct problem.

For the inverse problem, namely for finding the Euler angles, let us describe the rotation of the system by use of quaternions. In this case, a quaternion is a quadruple of numbers (x, y, z, w), where (x, y, z)—vector, and w—scalar. In this representation of the quaternion, it is obtained that the first three components are the vector, which lies on the axis of rotation, the length of the vector depending on the angle of rotation. The fourth component depends only on the angle of rotation. The dependence is quite simple—if we take the unit vector for the axis of rotation and the angle alpha for rotation about this axis, then the quaternion representing this rotation, can be written as follows:

$q=[V^*\sin(\text{alpha}/2), \cos(\text{alpha}/2)]$.

The initial data of the inverse problem are the two pairs of mutually related vectors, namely $(p_1, t_1) \rightarrow (a_1, v_1)$ and $(p_2, t_2) \rightarrow (a_2, v_2)$, where (p, t)—coordinates in the video camera's inherent coordinate system, and (a, v)—coordinates in the video camera's absolute coordinate system. Let us translate each of these vectors into the Cartesian coordinate system, and we obtain the corresponding vectors: $(x_i, y_i, z_i) \rightarrow (u_i, v_i, w_i)$, i=1, 2.

Now we will find the rotation quaternion of the camera initial coordinate system, transforming the vector $(x_1, y_1, z_1)$ into $(u_1, v_1, w_1)$. This quaternion will describe the rotation within the shortest distance. To find it, we use the following formulas:

$(x_1,y_1,z_1) \otimes (u_1,v_1,w_1) = (a,b,c)$–cross product of the input vector to the final vector;

$q=[a,b,c,(x_1,y_1,z_1)\cdot(u_1,v_1,w_1)]$–Required quaternion (here $(x_1,y_1,z_1)\cdot(u_1,v_1,w_1)$–scalar product of vectors).

And in the last step let us normalize the quaternion q, for this, we will divide x, y, z, w, included in it, by $n = \sqrt{x^2+y^2+z^2+w^2}$.

The quaternion, obtained in this step, sets the rotation of the Cartesian coordinate system, translating $(x_1, y_1, z_1)$ into $(u_1, v_1, w_1)$.

Let us rotate the coordinate system, for this, we use the rotation: $V'=qvq^{-1}$, where v—original vector, and V'—vector after the rotation. Thus, after the rotation of the Cartesian coordinate system quaternion q, we have two vectors: $(u_1, v_1, w_1)$, obtained from $(x_1, y_1, z_1)$, and a certain vector $(u_p, v_p, w_p)$, obtained from $(x_2, y_2, z_2)$. Now, it is necessary to rotate the Cartesian coordinate system such that the vector $(u_1, v_1, w_1)$ remains in place, and the vector $(u_p, v_p, w_p)$ passes into a vector $(u_2, v_2, w_2)$ (in general, it is possible not for any vectors, but as we take their values from the real system, we believe that such a rotation is possible).

Obviously, for such a rotation it is necessary that the axis of rotation passes through the point $(u_1, v_1, w_1)$ and the origin of coordinates. To find the rotation angle, we will find the angular distance between two points on a sphere $(u_p, v_p, w_p)$ and $(u_2, v_2, w_2)$. To this end, let us translate them into a spherical coordinate system: $\rightarrow(\varphi_1, \lambda_1)$ and $(\varphi_2, \lambda_2)$, respectively. Then we use the formula for finding the angular distance (this formula is widely used, for example, in astronomy):

$$\Delta\sigma = \arctan\left\{\frac{\sqrt{[\cos\phi_2 \sin\Delta\lambda]^2 + [\cos\phi_1 \sin\phi_2 - \sin\phi_1 \cos\phi_2 \cos\Delta\lambda]^2}}{\sin\phi_1 \sin\phi_2 + \cos\phi_1 \cos\phi_2 \cos\Delta\lambda}\right\}$$

where $\Delta\lambda$—difference between the coordinates of longitude, that is, the difference in the angle coordinates $\lambda$, and $\Delta\sigma$—angular difference.

Using the obtained corner and knowing the rotation axis, we get a rotation quaternion transforming the vector $(u_p, v_p, w_p)$ into $(u_2, v_2, w_2)$: $q_2=[(u_1, v_1, w_1)*\sin(\Delta\sigma/2), \cos(\Delta\sigma/2)]$ Thus, we have got two of the rotation quaternions, q and $q_2$, whose consistent application transforms the original points $(x_i, y_i, z_i)$ into $(u_i, v_i, w_i)$, i=1, 2. According to the definition and properties of quaternions, the rotation quaternion, which is equivalent to two consecutive applications q and $q_2$, is equal to $q_2*q$. We denote it as Q=[X, Y, Z, W].

Next, we use the familiar formula for translating the quaternion into the Euler angles and we obtain:

$$\begin{cases} \alpha = \text{arctg}\left(\frac{2XW-2XZ}{1-2Y^2-2Z^2}\right) \\ \beta = \arcsin(2XY+2ZW) \\ \gamma = \text{arctg}\left(\frac{2XW-2YZ}{1-2X^2-2Z^2}\right) \end{cases}$$

This calculation can be done with sufficient accuracy, since the location of an astronomical object can be estimated to within a few tenths/hundredths of a degree, according to the above.

It should be noted that the above-described method of automatic binding does not have to rely solely on an astronomical object (s). From the above description, it should be apparent to those skilled in the art that the role of the astronomical object, in fact, may be performed by any perceptible object, whose position in the video camera's absolute coordinate system is known or can be determined at a given point (s) of time with sufficient accuracy. Any immovable object, visible in the area, may serve as such object, which example is given below.

The above procedure 200 is implemented, at least partially (i.e., at least, its steps 206, 208), in the form of a computer-integrated module. The computer-integrated module is preferably a software that can be, in a local or distributed manner, stored in memory units and run by processors at the server 140, and/or the computer of the operator workstation 120, and/or the transmitting side equipment 111, depending from the design of the system 100. At the same time, the computer-integrated module may also be a hardware unit or a software and hardware unit (e.g., blade server in a blade server bay or a single computing device), which should be obvious for those skilled in the art. The above software can be developed using an appropriate technology of programming chosen from a plurality of available technologies.

2. Correction to the Video Camera Binding

To be able to sieve out the false objects when automatic detection algorithms are actuated, it is necessary to determine accurately the direction of the detected object as it is detected again. This task is complicated by the fact that the camera, for various reasons, changes its binding, that is, there is changed the orientation of the video camera's inherent coordinate system (rotating device) in the absolute (horizontal) coordinate system, related to the video camera location.

To eliminate the influence of this effect on the accuracy of determining the direction of the object when it is detected again, it is necessary to determine how the orientation of the video camera's inherent coordinate system in the absolute coordinate system changed for the period elapsed between the repeated detections.

To this end, it is proposed to use the objects visible on the terrain, of which it is known for certain that they do not change their position or change it slightly (i.e. they are substantially fixed). These objects can be any visible stationary objects (e.g., window shutters, road signs, etc.).

Figure 4:
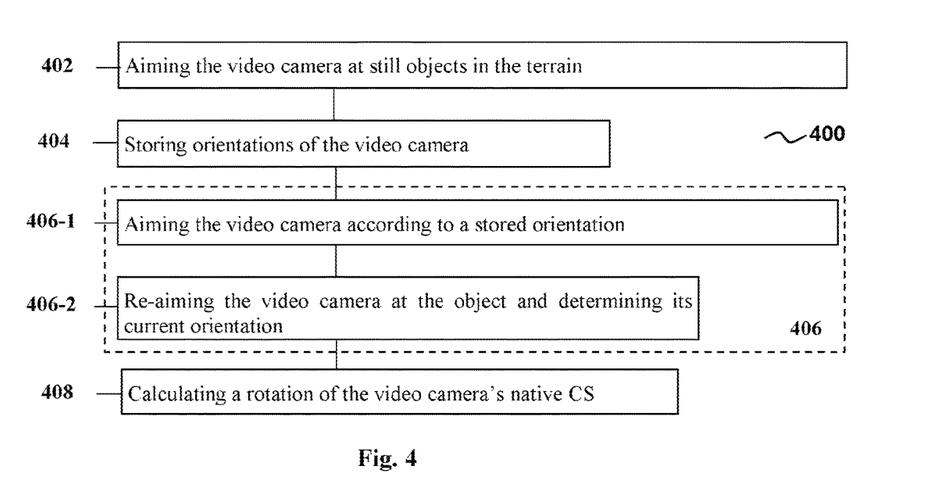
FIG. 4 is an illustrative logical flowchart of the method for determining a change in binding of the video camera's inherent coordinate system according the present invention.

Below with reference to FIG. 4, there is described the method 400 for determining the change in binding of the video camera, implemented by the forest fire video monitoring system (such as the system 100 of FIG. 1) according to the present invention.

In step 402, the video camera is pointed at each of at least two specified distinct fixed objects on the terrain and the orientation of the video camera in the video camera's inherent coordinate system is determined.

In step 404, the video camera orientations, determined in step 402, are stored. Certain orientation can be stored in the storing device comprised by the server 140 and/or the computer of the operator workstation 120.

If a check is necessary, the following sub-steps are performed in step 406 for each object of the said fixed objects. In sub-step 406-1, the video camera is pointed according to the video camera corresponding object orientation stored in step 404. In sub-step 406-2, if during the period between the pointings at the object, the video camera has moved (for example, due to the above possible causes), then the video camera is re-pointed at the object and its current orientation in the video camera's inherent coordinate system is determined.

In step 408, on the basis of the video camera current orientations determined in sub-step 406-2, and the video camera relevant orientations stored in step 404, they calculate the rotation of the video camera's inherent coordinate system, which determines the aforementioned adjustment for the video camera moving. In fact, they determine the rotation of the video camera's inherent coordinate system at the time of making the step 406 relative to the video camera's inherent coordinate system at the time of making the step 402.

Subsequently, for example, when the video camera detects a potentially dangerous object, her current orientation is compared with the orientation determined on the basis of previously stored orientation of the video camera to the object marked before as non-hazardous, and on the basis of the calculated rotation of the video camera's inherent coordinate system.

The possible implementation of steps 402-408 by means of the components of the system 100 is indicated above or follows from its description in an obvious manner.

For those skilled in the art it is evident that when implementing the above procedure 400, more than two stationary objects can be used. Their number is generally determined by the required accuracy—so, if the number of objects increases, we increase the number of independent measurement results, which leads, with appropriate processing, to an increased accuracy of direction determination.

As described above, for determining the rotation, it is necessary to determine the Euler angles, which in this case will describe the rotation of the video camera's inherent coordinate system for the current moment relative to the video camera's inherent coordinate system fixed during the preceding procedure of saving the orientation.

As regards the essence of the matter and the complexity, the mathematical problem is identical to that described above.

Suppose that the camera moved slightly, that is, the visible object coordinates in their video camera's inherent coordinate systems, namely (p11, t11) (which had previously been saved), became different, namely (p12, t12). We obtain the correspondences:

$(p_{11}, t11)–(p12, t12)$,
$(p21, t21)–(p22, t22)$

On the basis of these correspondences, similar to the above, we define the Euler angles, that is, e1=f1(p11, t11, p12, t12, p21, t21, p22, t22),
e2=f2(p11, t11, p12, t12, p21, t21, p22, t22),
e3=f3(p11, t11, p12, t12, p21, t21, p22, t22).

After finding the Euler angles (e1, e2, e3) for each of the previously marked objects (such as non-hazardous), and having the video camera orientation to this object saved (p1, t1), it is possible to determine the adjusted orientation of the video camera to the given object (pn, tn), that is, the orientation adjusted for the video camera deviation is as follows:

pn=f1(e1, e2, e3, p1, t1),
tn=f2(e1, e2, e3, p1, t1)

according to the method described above, when compared to the current orientation of the camera.

For the most accurate operation of the system, we can perform the procedure 400 of binding before each patrolling; this procedure is expected to take no much time (a few seconds).

Figure 5:
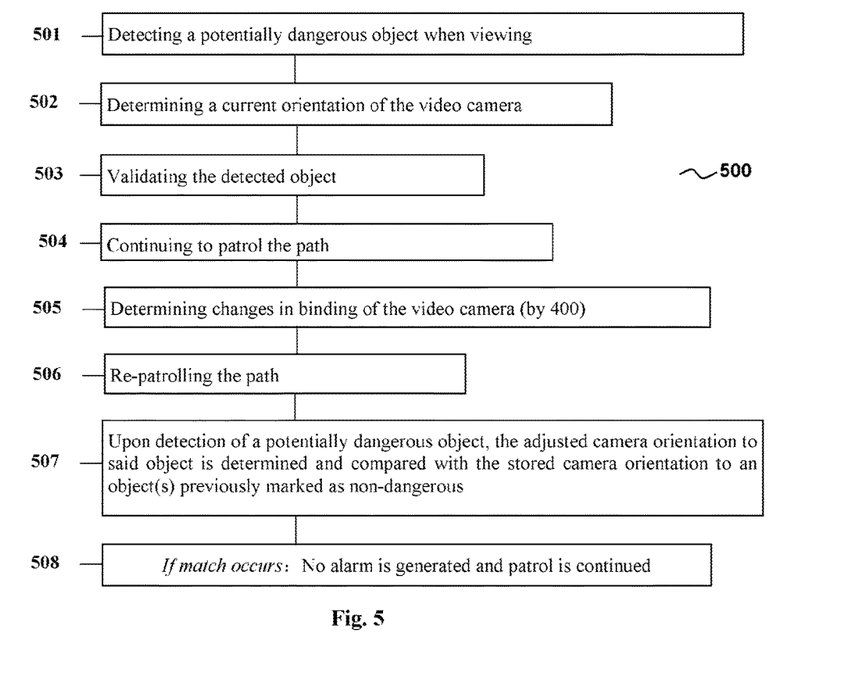
FIG. 5 is an illustrative logical flowchart of filtration of the observed objects on patrolling.

Referring to FIG. 5, the method 500 for filtering the observed objects, which involve the above method 400, may operate as follows.

During the patrolling, the video camera inspects the territory; the automatic algorithm for detection of dangerous objects identifies a potentially dangerous object (step 501) in the video image. Upon this, the current orientation of the camera is identified (step 502). Further, the detected object is validated in any manner—for example, the operator himself performs it, which may consist in a visual representation of the potentially dangerous object to the operator who should confirm or refute the danger of the object detected (step 503). After that, the system continues to patrol along the specified path (step 504).

After some time, determined by the class of fire danger and the requirements for the rate of detection (for example, every 15 minutes), the system starts, once again, travelling the path (step 506). Before this, there is performed the procedure of determining the changes in binding of the video camera according to the above method 400 (step 505).

When a potentially dangerous object is detected, the orientation of the video camera to it is determined and compared with the stored video camera orientation to the object (s) that during the past patrolling (s) was designated as non-hazardous, the orientation being adjusted on the basis of the computed rotation of the video camera inherent coordinate system (step 507). If the orientations coincide with a specified accuracy determined by the system settings (e.g., up to 0.01), then the system does not create a new alarm for the operator and does not require validation, and continues to patrol (step 508). This method can significantly reduce the operator workload, increase the number of cameras per operator and reduce the number of false alarms.

The above procedure 200 is implemented, at least partially (i.e. at least, its steps 206, 208), in the form of a computer-integrated module. The computer-integrated module is preferably a software that can be, in a local or distributed manner, stored in memory units and run by processors at the server 140, and/or the computer of the operator workstation 120, and/or the transmitting side equipment 111, depending from the design of the system 100. At the same time, the computer-integrated module may also be a hardware unit or a software and hardware unit (e.g., blade server in a blade server bay or a single computing device), which should be obvious for those skilled in the art. The above software can be developed using an appropriate technology of programming chosen from a plurality of available technologies.

The invention has been described above with reference to specific embodiments thereof. For those skilled in the art other embodiments of the invention can be obvious, without departing from the spirit thereof, as it is disclosed herein. Accordingly, the invention should be considered as limited in scope only by the following claims.

The invention claimed is:

1. The forest fire video monitoring system comprising:
   at least one remotely controlled video monitoring point which includes a high-rise building and the transmitting side equipment located on the high-rise building, comprising a video camera on a rotating device and a camera control unit configured to determine the current spatial orientation of the video camera in the inherent coordinate system of the camera,
   at least one computer-assisted operator workstation for the operation of the said video monitoring point, and
   a storing device for storing the orientations of the video camera in the video camera's inherent coordinate systems, defined by the camera control unit after pointing the video camera at each of at least two distinct specified fixed objects on the terrain, and a computer-integrated module configured:
to get, for each object of these objects, the current orientation of the video camera's inherent coordinate system, defined by the camera control unit after re-pointing camera at the object, and
based on the current orientation of the video camera and the corresponding stored orientations of the video camera, to calculate the rotation of the video camera inherent coordinate system.

2. The system of claim 1, wherein the computer-integrated module is further configured, when comparing the current orientation of the camera, pointed at the observed object with the stored video camera orientation pointed to a previously analyzed object, to adjust this stored orientation of the camera on the basis of the calculated rotation of the video camera's inherent coordinate system.

3. In a forest fire video monitoring system comprising at least one remotely controlled video monitoring point including: a video camera with a rotating device residing on a high-rise construction; and a camera control unit configured to determine a current spatial orientation of the video camera in a native coordinate system of the video camera, a method for determining changes in binding of the video camera, the method comprising the steps of:

aiming the video camera at each of at least two predetermined discernible still objects in the terrain, and determining an orientation of the video camera in the native coordinate system of the video camera;
storing the determined orientations of the video camera; for each of said objects:
aiming the video camera according to the stored orientation of the video camera corresponding to said object, and, in case of deviation of the video camera from the object, re-aiming the video camera at the object, and
determining a current orientation of the video camera in the native coordinate system of the video camera; and
based on the determined current orientations of the video camera and the respective stored orientations of the video camera, calculating a rotation of the native coordinate system of the video camera.

4. The method of claim 3, wherein when comparing the current orientation of the camera, pointed at the observed object with the stored orientation of the video camera when it is pointed to a previously analyzed object, they correct this stored orientation of the video camera based on the calculated rotation of the video camera's inherent coordinate system.

* * * * *